Sept. 3, 1935.  W. FITZ  2,013,438
RECOVERY OF SALTS FROM SALT SOLUTIONS
Filed Dec. 23, 1931
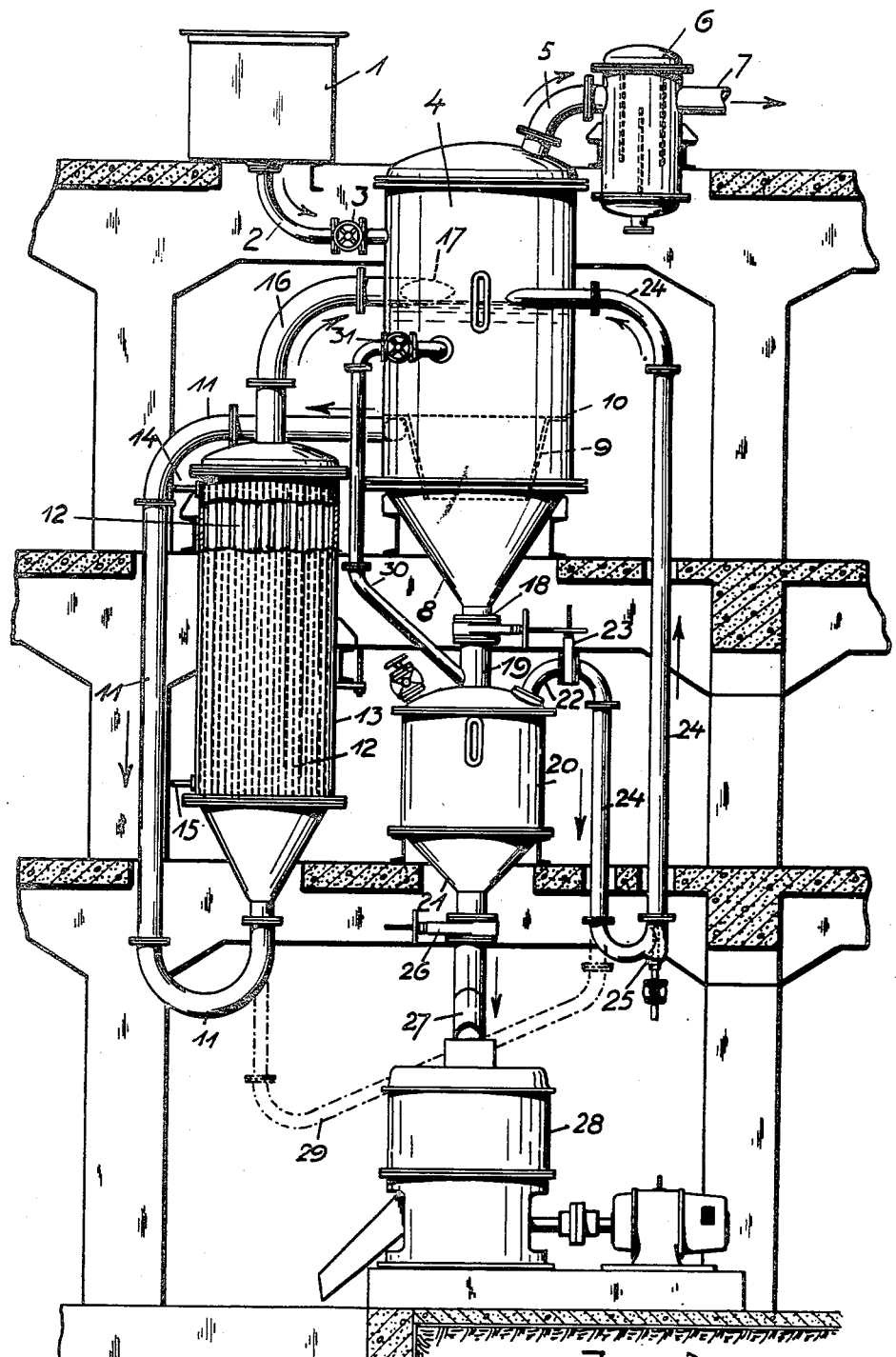
Inventor:
Wilhelm Fitz Patented Sept. 3, 1935

UNITED STATES PATENT OFFICE 2,013,438

2,013,438

RECOVERY OF SALTS FROM SALT SOLUTIONS

Wilhelm Fitz, Essen-Ruhr, Germany, assignor, by mesne assignments, to The Koppers Company of Delaware, Pittsburgh, Pa., a corporation of Delaware Application December 23, 1931, Serial No. 582,775
In Germany December 22, 1930

2 Claims. (Cl. 159—50)

The invention relates to the recovery of salts from salt solutions by evaporating same and more especially to such recovery of salt from salt solutions, whereby the salt solution is evaporated preferably at decreased pressure in an evaporator, which is provided with an evaporating vessel, fitted with a heater or connected up with a heater by return and delivery pipe lines, said heater provided with means for removing from the evaporating vessel the crystals which are precipitated to the bottom.

It is, in many cases, important when recovering salt from salt solutions to obtain the salts in the form of large crystals. Such a case is for example the recovery of sulphate of ammonia from ammonium sulphate solutions, the ammonium sulphate salt being intended to serve as fertilizer. It is well-known, that ammonium sulphate in fine crystals is liable to form into lumps and same can only be spread over the fields in a very poor manner. On the other hand, sulphate of ammonia consisting of large crystals, remains always loose and can be readily spread even by hand, without any previous grinding being necessary. Salt in large crystals offers the further advantage when used as a fertilizer in as much as the large grains of the salt are not so easily carried off by the wind as is the case of salt in fine crystals.

One object of my invention is to provide improvements in the manufacture of salts from salt solutions which render it possible to recover from the salt solutions, salt composed of large crystals.

The process invented by me consists essentially in the following steps. The salt solution to be treated is suitably evaporated in an evaporator apparatus, preferably standing under decreased pressure. The crystals which separate out from the salt solution during evaporation, are led off, whereupon they are treated with a fluid in such a way that the smaller crystals swim off. The fluid containing a large quantity of smaller crystals, which during this treatment is obtained, according to my present invention, is drawn off from the salt pulp, consisting chiefly of the larger crystals, and then is added to the fluid to be evaporated.

The advantage offered by my process lies in the fact that from the fluid to be evaporated only the larger crystals are recovered, whereas the smaller ones present in the fluid are always returned to the salt solution, so that the latter remains sufficiently long in the salt fluid as necessary, in order to permit that they increase to the desired size.

A further object of my invention is to provide a contrivance for carrying out the process according to my present invention.

The contrivance worked out by me for this purpose, comprises an evaporator, preferably provided with a conical bottom, the liquid container of said evaporator is connected up with a heater of the fluid with a delivery and return pipe line. At the lowest part of the conical bottom of the evaporating vessel, I connect up a pipe line controlled by a valve, which opens out into a second vessel, which likewise is preferably provided with a conical bottom. This latter vessel stands in communication by means of a pipe line with the evaporator or the preheater.

With these and other objects of the invention in view, I will now describe the nature of the present invention on the lines of the accompanying drawing which shows an evaporating contrivance constructed in accordance with this invention for the recovery of large crystal salts from salt fluids, in a side view and in a partial section.

In the case of the contrivance shown, the salt fluid to be evaporated is led forward from a storage container 1 through a pipe line 2, controlled by a valve 3, into an evaporating vessel 4 of an evaporating contrivance. The evaporating vessel is connected up at the upper end by the pipe line 5 with a spray-trap 6, from which a pipe line 7 leads to a condensator which is, however, not shown on the drawing. The evaporating contrivance is kept preferably during the process of evaporation under decreased pressure, which is thereby attained that the condensator, not given on the drawing, is connected up with a vacuum pump.

The evaporating vessel 4 has a conical bottom 8, above which a hopper-shaped inset 9 is provided, which at the point 10 is firmly or slidably connected up with the side walls of the evaporator 4. From the space between the hopper-shaped inset 9 and the conical bottom 8, a pipe line 11 leads off, which goes to the lower end of a customary liquid heater 13 provided with vertical heating pipe lines 12, which is arranged on the one side beneath the evaporator. Through the pipes 12 of the preheater 13, the liquid to be evaporated is passed through and the pipe lines are sprayed in this connection from outside with steam or hot gases which are led off through the pipe branch 14 to and through the pipe branch 15 from the liquid heater.

From the liquid inside the pipe lines 12 vapours are produced and rise upwards in a pipe line 12 and thus drive the liquid upwards into the evaporating vessel through the pipe line 16, leading from the upper end of the heater 13 to the evaporator 4 again. It is of advantage in this connection to arrange the opening 17 of the pipe line 16 somewhat above the normal level of the liquid in the evaporating vessel 4.

The contrivance is so designed, that the liquid from the evaporator 4, when running the contrivance, is drawn off continuously from the space between the inset 9 and the bottom 8 of the evaporator, heated up and then returned to the evaporating vessel 4, whereupon a portion of the liquid is steamed off, whilst the remainder of the liquid falls downwards and reaches again the heater 13.

By reason of the continual evaporation of the water, solid salts are separated out from the salt fluid to be treated. The salt is deposited principally in the conical bottom 8. In consequence of the strong stream of liquid, flowing around the lower edge of the hopper-shaped inset 9, any deposit of the smaller, easily swimming off crystals, on the conical bottom, is prevented to a great extent. The salt pulp thrown down, is then drawn off through the pipe line 19, controlled by the damper 18, which goes off at the lowest point of the conical bottom 8 into a salt vessel 20, likewise provided with a conical bottom 21.

From the salt vessel 20, a pipe line 22 controlled by a valve 23 leads to a U-shaped bent pipe line 24. The pipe line 24 is connected up at its other end with the evaporating vessel 4. The pipe line 24 extends so far downwards that the liquid contained in same, is lifted completely by the vacuum, prevailing in the evaporator. At the lower end of the U-shaped pipe line 24, there is arranged a contrivance 25 for the blowing in of steam into the joint of the pipe line 24 leading to the evaporator by means of which the liquid can be forced upwards into the part of the pipe 24, leading to the evaporator 4.

The running of the contrivance, shown on the drawing, is such that the salt pulp depositing in the conical bottom 8, is led off by the opening of the damper 18 into the salt vessel 20. The salt is in this connection stirred up and in the salt vessel 20 then again only the larger crystals are precipitated to the bottom, whereas the smaller crystals swim off with the liquid into the pipe line 22, from where they reach the U-shaped pipe 24 after the opening of the damper 23. When the steam is blown in through the contrivance 25 into the pipe line 24, then the fluid containing the smaller crystals is carried back again to the evaporating vessel 4.

There, therefore, takes place in the case of the contrivance constructed according to this invention a dolble separating out of the smaller crystals from the salt pulp produced. The first time, when the salt is precipitated on the conical bottom 8 of the evaporator in consequence of the stream of fluid, which is led off through the hopper inset 9 downwards and in the second case in the salt vessel 20 by reason of the action of the stirring up of a part of the stream, which is led off into the vessel 20 from the evaporator 4.

On the conical bottom 21 of the salt vessel 20 in the course of the running, a salt collects, which consists for the most part of large crystals in any case, no very small crystals whatever are contained in same. In order to take off the salt pulp from the vessel 20, first of all the damper 18 is closed and then the salt draw-off damper 26 situated on the lowest part of the conical bottom 21, is opened whereupon the salt pulp runs off through the pipe 20 to a centrifugal 28, in which the crystals are separated out from the mother solution still adhering to same.

Instead of connecting up the salt vessel 20 with the evaporating vessel 4, it is also possible, as shown by the dotted lines 29, to connect up same with the pipe 11, leading up to the heater for the fluid, this latter connection offers in many cases, in so far an advantage, inasmuch as any small crystals still present in the liquid circulating can be carried back again direct to the parts of the liquid to be evaporated, in which connection the smaller crystals serve as a point of crystal concentration and thus increase rapidly in size.

In order to wash out the smaller crystals from the salt vessel 20 without, however, disturbing the deposits of the larger crystals on the conical bottom 8, it is possible to further provide between the container holding the fluid of the evaporator 4 and the salt vessel 20 a connecting pipe 30, which is controlled by a valve 31, which allows of drawing off continually or intermittently so much of the fluid into the salt vessel 20, which may be necessary for washing out the salt pulp, collecting there and for causing the smaller crystals to swim off.

The invention as hereinabove set forth is embodied in a particular form, but may be variously embodied within the scope of the claims, hereinafter made.

I claim:

1. The process of recovering large crystals of solid salts from salt solutions, comprising evaporating the salt solution to be treated in such way that crystals are separated out of the salt solution, collecting the crystals separated out of solution in a heap in the fluid undergoing evaporation in the evaporation stage, passing a stream of the evaporation fluid while undergoing evaporation in the evaporation stage over the heap of crystals in the evaporation stage so that smaller crystals swim off in the evaporation stage, removing the salt crystals of the heap from the fluid of the evaporation stage, treating in a separate zone the salt crystals removed from the fluid of the evaporation stage with a liquid to swim off therefrom the smaller crystals from the larger crystals, separating out from the larger crystals in the swimming stage the larger part of the swim liquid together with the small crystals swimming in the same from the larger crystals left in the swimming stage, and finally recovering the larger crystals from the swimming stage.

2. The process of recovering large crystals of solid salts from salt solutions, comprising evaporating the salt solution to be treated in such way that crystals are separated out of salt solution, collecting the crystals separated out of solution in a heap in the fluid undergoing evaporation in the evaporation stage, passing a stream of the evaporation fluid while undergoing evaporation in the evaporation stage over the heap of crystals in the evaporation stage so that smaller crystals swim off in the evaporation stage, removing the salt crystals of the heap from the fluid of the evaporation stage, treating in a separate zone the salt crystals removed from the fluid of the evaporation stage with a liquid to swim off therefrom the smaller crystals from the larger crystals, separating out from the larger crystals in the swimming stage the larger part of the swim liquid together with the small crystals swimming in the same from the larger crystals left in the swimming stage, finally recovering the larger crystals from the swimming stage, and in which for the swimming treatment of the salt crystals in the separate zone a portion of the salt solution from the evaporation stage is used to swim off the smaller crystals.

WILHELM FITZ.